(12) United States Patent
Rubin et al.

(10) Patent No.: US 9,190,091 B2
(45) Date of Patent: Nov. 17, 2015

(54) COMPOSITION AND METHOD FOR PLANARIZED BIT-PATTERNED MAGNETIC MEDIA

(71) Applicant: HGST Netherlands B.V., Amsterdam (NL)

(72) Inventors: Kurt A. Rubin, San Jose, CA (US); Richard L. White, Los Altos, CA (US); Xiaoping Bian, Saratoga, CA (US)

(73) Assignee: HGST NETHERLANDS, B.V., Amsterdam (NL)

( * ) Notice: Subject to any disclaimer, the term of this patent is extended or adjusted under 35 U.S.C. 154(b) by 0 days.

(21) Appl. No.: 13/958,214

(22) Filed: Aug. 2, 2013

(65) Prior Publication Data

US 2015/0037614 A1 Feb. 5, 2015

(51) Int. Cl.
*G11B 5/66* (2006.01)
*G11B 5/72* (2006.01)
*G11B 5/84* (2006.01)
*G11B 5/855* (2006.01)

(52) U.S. Cl.
CPC ............... *G11B 5/72* (2013.01); *G11B 5/8408* (2013.01); *G11B 5/855* (2013.01)

(58) Field of Classification Search
CPC ........ G11B 5/746; G11B 5/72; G11B 5/8408; G11B 5/855
See application file for complete search history.

(56) References Cited

U.S. PATENT DOCUMENTS

| | | | |
|---|---|---|---|
| 6,565,718 B1 | 5/2003 | Chour et al. | |
| 6,940,692 B2 | 9/2005 | Dai et al. | |
| 7,625,495 B2 | 12/2009 | Hofmann et al. | |
| 8,021,713 B2 | 9/2011 | Jayashankar | |
| 8,168,311 B2 | 5/2012 | Mate et al. | |
| 8,252,437 B2 | 8/2012 | Rawat et al. | |
| 2005/0199581 A1 | 9/2005 | Suwa et al. | |
| 2006/0257694 A1 | 11/2006 | Hieda et al. | |
| 2006/0269796 A1 | 11/2006 | Hyodo | |
| 2009/0081482 A1* | 3/2009 | Kimura et al. | ................ 428/810 |
| 2010/0002329 A1 | 1/2010 | Hsia et al. | |
| 2010/0062282 A1 | 3/2010 | Yen et al. | |

(Continued)

FOREIGN PATENT DOCUMENTS

WO 2011/028597 A1 3/2011

OTHER PUBLICATIONS

F.W. Preston, The Theory and Design of Plate Glass Polishing Machines, Journal of the Society of Glass Technology, vol. 11, pp. 214, 1927.

(Continued)

*Primary Examiner* — Holly Rickman
(74) *Attorney, Agent, or Firm* — Kunzler Law Group, PC (57) ABSTRACT

The present disclosure relates to a planarized bit-patterned magnetic medium that has a magnetic layer, including island regions and trench regions, a first carbon layer applied over the magnetic layer, and a second carbon layer applied over the first carbon layer, wherein the second carbon layer has been removed in the island regions. The first carbon layer may have a lower material removal rate when exposed to chemical-mechanical polishing than the second carbon layer. The present disclosure also relates to a method for planarizing a bit-patterned magnetic medium and a slurry composition for the chemical-mechanical polishing of carbon layers, the slurry composition including an oxidizer component, a catalyst component, a particulate component, and a reaction control component.

14 Claims, 6 Drawing Sheets

(56) References Cited

U.S. PATENT DOCUMENTS

| 2010/0128378 | A1 | 5/2010 | Fukushima et al. |
| 2011/0141620 | A1 | 6/2011 | Fan et al. |
| 2012/0107646 | A1 | 5/2012 | Rawat et al. |
| 2012/0140357 | A1* | 6/2012 | Yakushiji et al. ............... 360/75 |

OTHER PUBLICATIONS

Lenntech, Fenton's reaction, http://www.lenntech.com/fenton-reaction.htm, retrieved Feb. 8, 2013.

Barbusinski, Fenton Reaction-Controversy Concerning the Chemistry, Ecological Chemistry and Engineering S, 2009, vol. 16, No. 3. Silesian University of Technology, Gliwice, Poland.

Tysoe et el., How Do Lubricants Really Bond to Hard Drives?, Tbibology & Lubrication Technology, www.stle.org., Jun. 2012.

K. Iechika, Performance of Hard DLC Protective Film Prepared by PECVD Method for Thin Film Magnetic Disk, IEEE Xplore Digital Library, Nov. 1994, Magnetics, IEEE Transactions, vol. 30, Issue 6, pp. 4134-4136.

Yongjian Sun, Ultrathin Ion-Beam Carbon as an Overcoat for the Magnetic Recording Medium, Magnetics, IEEE Transactions, Jan. 2003, vol. 39, Issue 1, pp. 594-598.

D.J. Li et al. Ultrathin CNx overcoats for 1Tb/in.2 hard disk drive systems, Applied Physics Letters, vol. 81, No. 6, Aug. 5, 2002.

Robertson, Diamond-Like Amorhous Carbon, Materials Science and Engineering R 37, 2002, 129-281.

Robertson, Hard Amorphous (Diamond-Like) Carbons, Prog. Solid St. Chan. vol. 21, pp. 199-333, 1991, Pergamon Press Ltd., Great Britain.

* cited by examiner

COMPOSITION AND METHOD FOR PLANARIZED BIT-PATTERNED MAGNETIC MEDIA

FIELD

This disclosure relates to planarized bit-patterned magnetic media and more particularly relates to the chemical-mechanical polishing of carbon layers applied onto bit-patterned magnetic media.

BACKGROUND

For many years conventional magnetic storage devices have been used to store data and information. Magnetic storage devices generally include a magnetic medium with units (e.g., bits) of magnetic material that can be polarized to distinct magnetic states. The direction of the magnetization points in different directions, which can be referred to as a positive state and a negative state. Each bit can store information (generally binary information in the form of either a 1 or a 0) according to the magnetic polarization state of the bit. Accordingly, magnetic storage devices generally include a "read" element that passes over the magnetic material and perceives the magnetic polarization state of each bit and a "write" element that passes over the magnetic material and changes the magnetic polarization state of each bit, thereby recording individual units of information. Therefore, the amount of information that can be stored on a magnetic storage medium is proportional to the number of magnetic bits on the magnetic storage medium.

There are various types of magnetic storage media and each type involves different fabrication techniques. For example, conventional granular magnetic recording media are disks that have multiple grains in each magnetic bit. In granular magnetic media, all of the domains are co-planar and the surface of the disk is relatively continuous. In order to increase the amount of information that can be stored on a granular magnetic disk, the number of grains per magnetic bit can be decreased while keeping the grain size approximately the same. However, with fewer grains in each bit, there is decreased signal-to-noise ratio (e.g., less signal and more noise). In order to maintain a better signal to noise ratio, methods have been developed that decrease both the size of the magnetic bit and the size of the individual grains making up each magnetic bit, thus keeping the same number of grains in each magnetic bit. However, when the grains become too small, thermal fluctuations can cause the grains to spontaneously reverse polarity, thus resulting in unstable storage and a loss of information.

Bit-patterned media is another example of magnetic storage media. In bit-patterned media, each bit is a single magnetic domain rather than a collection of contiguous magnetic grains. The bits can be topographically patterned using lithographic and etching techniques to form magnetically isolated bit islands surrounded by trenches. In some instances, the trenches are formed by etching away a magnetic material. In yet other instances, the physical patterns are etched into a non-magnetic substrate and then a magnetic material is coated over the patterned substrate. Because of the physical separation between the elevated bit islands and the trenches, the width of each distinct bit island can be decreased in order to increase the areal bit density of the device, while still maintaining a high signal-to-noise ratio and high thermal stability.

However, because bit-patterned media is topographically patterned, a planarization process is often required in order to fill in the trenches with a magnetically inert material to create a smooth surface over which the read/write head may pass. As areal bid density increases, read/write heads must fly closer to the magnetic surface in order to sense and record magnetic polarization states. If bit-patterned media were not planarized, the uneven surface of a medium would cause read/write heads to turbulently fly across the surface of the medium and crash into the medium, likely causing catastrophic data loss and device failure.

In conventional granular magnetic media (non bit-patterned), carbon overcoat layers are often used to protect the magnet medium. Overcoat layers containing carbon beneficially improve corrosion resistance, enhance the tribological properties of the medium, and bond well with the polymer lubricants used in magnetic hard drive applications. However, when a conventional carbon overcoat layer is used as the inert filler material in a bit-patterned media application, conventional planarization techniques, such as chemical-mechanical polishing, are not efficiently able to polish the conventional carbon containing filler layer, if at all. Thus, in order to planarize and protect bit-patterned media, multiple processing steps using various materials are often required, thereby adding to the complexity and expense of media fabrication.

SUMMARY

From the foregoing discussion, it should be apparent that a need exists for a planarization system that works to polish and protect bit-patterned magnetic media. Beneficially, such a planarization system would provide for carbon containing layers to be used as filler and overcoat layers, thus allowing bit-patterned magnetic media to be polished under the same, or at least similar, conditions as conventional granular magnetic media.

The subject matter of the present application has been developed in response to the present state of the art, and in particular, in response to the problems and needs in the art that have not yet been fully solved by currently available bit-patterned magnetic media planarization systems. Accordingly, the present disclosure has been developed to provide a bit-patterned magnetic media planarization method and composition that overcomes many or all of the above-discussed shortcomings in the art.

The present disclosure relates to a planarized bit-patterned magnetic medium that has a magnetic layer, including island regions and trench regions, a first carbon layer applied over the magnetic layer, and a second carbon layer applied over the first carbon layer, wherein the second carbon layer has been removed in the island regions. The first carbon layer of the planarized bit-patterned magnetic medium may have a lower material removal rate when exposed to chemical-mechanical polishing than the second carbon layer. In one embodiment, the first carbon layer has a higher density than the second carbon layer. According to one embodiment, the first carbon layer has a density great than 2.0 gm/cc and the second carbon layer has a density less than 2.0 gm/cc. In another embodiment, the first carbon layer has a density greater than 2.2 gm/cc and the second carbon layer has a density less than 2.2 gm/cc. In yet another embodiment, the first carbon layer has a density greater than 2.0 gm/cc and the second carbon layer has a density less than 1.8 gm/cc.

In another embodiment, the first carbon layer has a higher sp3-type bond content than the second carbon layer. In another embodiment, the first carbon layer has a higher hardness rating than the second carbon layer. For example, an according to one embodiment, the first carbon layer may have a hardness about or above 15 GPa and the second carbon layer has a hardness rating that is less than about 15 GPA. Also, the second carbon layer may include a hydrogenated carbon compound, a nitrogenated carbon compound, or a hydrogenated and nitrogoenated carbon compound. According to one implementation, the composition of the second carbon layer varies across the thickness of the second carbon layer.

The present disclosure also relates to a method for planarizing a bit-patterned magnetic medium. The method, according to one embodiment, includes providing a bit-patterned magnetic medium that has a magnetic layer with trench regions and island regions, a first carbon layer applied over the magnetic layer and a second carbon layer applied over the first carbon layer, providing a chemical-mechanical polishing system that comprises a polishing pad, providing a particulate slurry, providing a reaction control component, combining the particulate slurry and the reaction control component to form a polishing slurry, and removing a substantial amount of the second carbon layer from above the island regions by polishing the bit-patterned magnetic medium with the polishing pad wetted with the polishing slurry.

In one example, the providing the particulate slurry includes providing an oxidizer component, a catalyst component, and a particulate component. The reaction control component may include a base, such as a hydroxide salt, to promote the reaction. According to another embodiment, combining the particulate slurry and the reaction control component includes injecting both onto the polishing pad during or before chemical-mechanical polishing. In another embodiment, the reaction control component includes potassium hydroxide (KOH). In another embodiment, the reaction control component includes sodium hydroxide (NaOH).

The present disclosure still further relates to a slurry composition for the chemical-mechanical polishing of carbon layers, the slurry composition including an oxidizer component, a catalyst component, a particulate component, and a reaction control component. According to one embodiment, the oxidizer component includes a peroxide, a permanganate, or a nitric acid. In one embodiment, the catalyst component includes a transition metal salt, such as $FeSO_4$. In one implementation, the reaction control element includes a base, such as a hydroxide salt (e.g., potassium hydroxide and sodium hydroxide). In another example, the particulate component includes silica, alumina, or diamond particles.

Reference throughout this specification to features, advantages, or similar language does not imply that all of the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the subject matter disclosed herein. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the subject matter of the present application will be described and explained with additional specificity and detail through the use of the accompanying drawings, in which.

DETAILED DESCRIPTION

Figure 1:
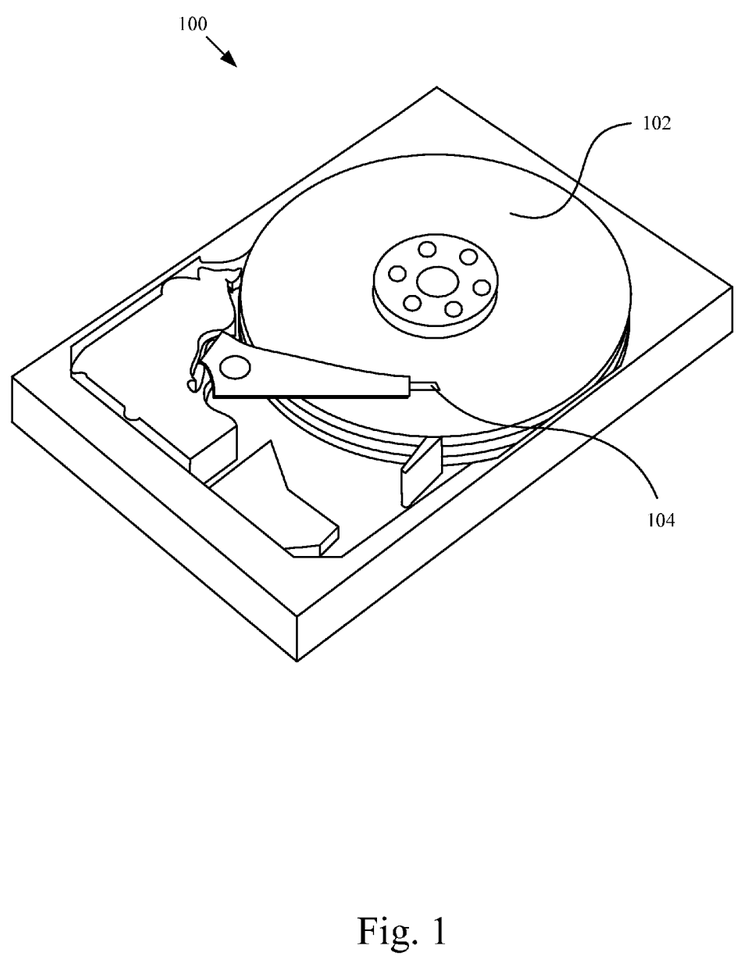
FIG. 1 is a perspective view of a magnetic storage device, according to one embodiment.

FIG. 1 is a perspective view of a magnetic storage device 100, according to one embodiment. As described above in the Background section, bit-patterned magnetic media is capable of achieving higher areal bit densities than conventional granular magnetic media. The achievement of higher areal densities is realized because of the topographic pattern of the elevated islands and depressed trenches and the corresponding thermal and magnetic stability that results from such a configuration. However, in most applications, bit-patterned magnetic media must be planarized in order to be effectively implemented in magnetic storage devices.

The depicted magnetic storage device 100 of FIG. 1 includes a magnetic medium 102 and a read/write head 104. The read/write head 104, in conventional magnetic storage devices, floats a distance above the surface of the magnetic medium 102. The distance, known as the flying height, may be as small as several nanometers. With the read write/head 104 flying so close to the magnetic medium 102, the magnetic medium needs to have a substantially smooth and planar surface. Any variation or irregularity on the surface of the medium 102 may cause the read/write head 104 to crash into the medium 102, potentially causing information loss and device 100 failure. Accordingly, planarization techniques, such as chemical-mechanical polishing, may be used to smooth the surface of the medium 102.

Figure 2:
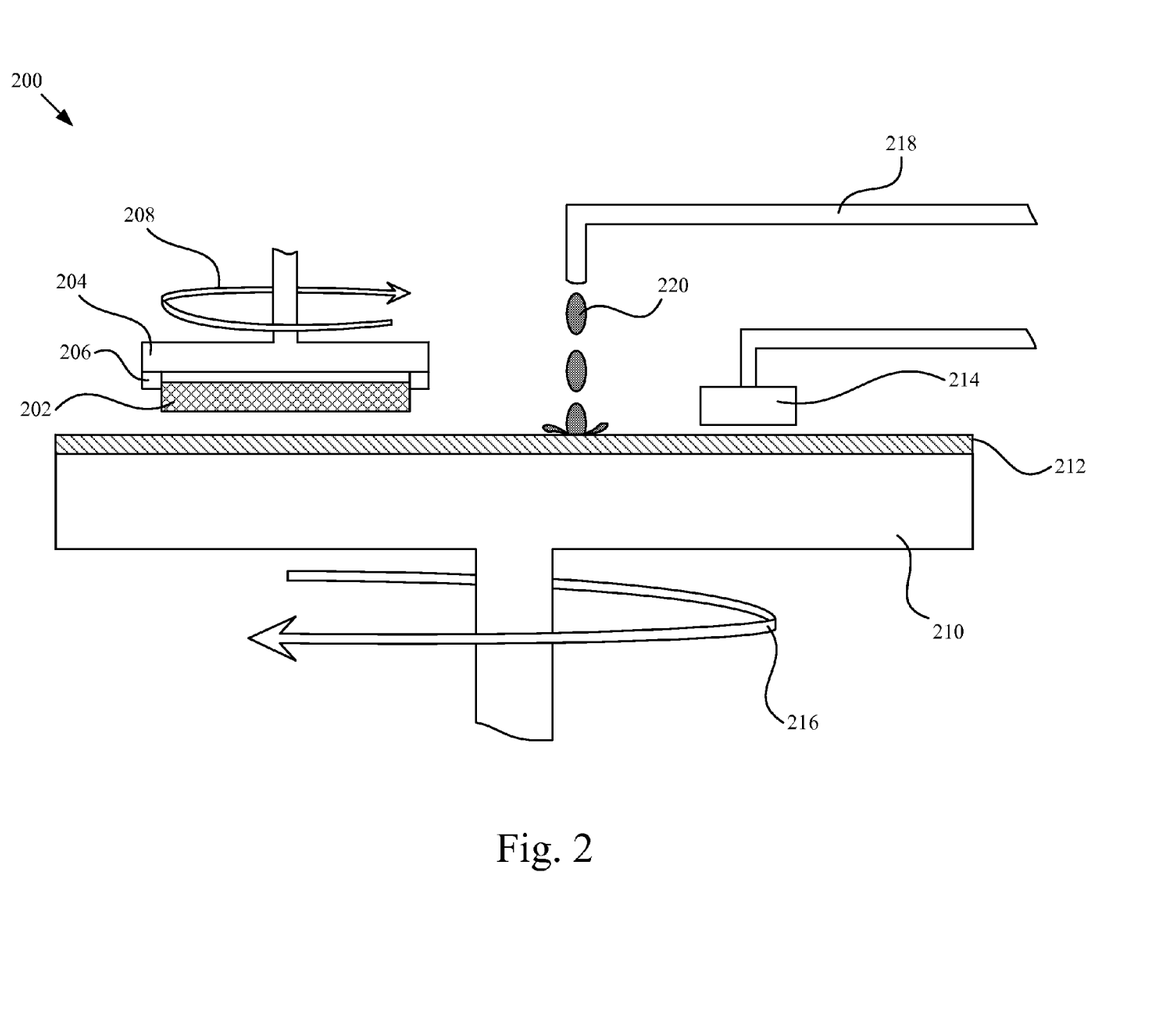
FIG. 2 is a cross-sectional side view of a chemical-mechanical polishing system, according to one embodiment.

FIG. 2 is a cross-sectional side view of a chemical-mechanical polishing system 200, according to one embodiment. The system 200 includes a bit-patterned magnetic medium 202, a carrier 204, a carrier retaining ring 206, an arrow depicting the rotation 208 of the carrier 204, a polishing platen 210, a polishing pad 212, a polishing pad conditioner 214, an arrow depicting the rotation 216 of the polishing platen 210, a slurry supply line 218, and a slurry 220. Chemical-mechanical polishing is the process of using both chemical reagents and mechanical forces to planarize and smooth a surface.

As depicted, an unpolished magnetic medium 202 may be attached to a carrier 204 by a carrier retaining ring 206. The retaining ring 206 keeps the medium 202 in the proper horizontal alignment so as to avoid uneven planarization. The polishing pad 212 is attached to and covers the polishing platen 210. In some implementations, the polishing pad 212 may be substantially non-abrasive and have a negligible polish rate on the carbon films. The term polish rate is defined by the amount of thickness removed divided by the duration in time of the polishing. The pad may have grooves formed in the pad to facilitate the flow of slurry. In yet some implementations, the polishing pad 212 may be constructed of a rough and/or abrasive material. Accordingly, depending on the material to be polished, the velocity of the platen 210 and carrier 204, and/or the type of slurry used, various types of polishing pads 212 may be used. According to one embodiment, the pad 212 may be made of porous polymeric materials with a pore size of several micrometers or more. As the pads 212 are consumed in the planarization process, the pads 212 may be reconditioned (e.g., by a polishing pad conditioner 214) and/or may be replaced. The arrow depicting the rotation 208, 216 of the carrier 204 and the polishing platen 210, respectively, are included in FIG. 2 only to show rotation generally and are not included to depict direction or actual/relative velocity.

The system 200 depicted in FIG. 2 also includes a slurry supply line 218 and a slurry composition 220. The slurry supply line 218 feeds the liquid slurry 220 onto the polishing pad 212. With the slurry 220 wetting the pads 212, a force may be applied to move the medium 202 into contact with the polishing pad 212 as both the carrier 204 and the polishing platen 210 rotate. The mechanical forces caused by the downward force and the rotating bodies, combined with the chemically active slurry 220, cause material to be removed from the surface of the medium 202, thus planarizing, smoothing, and polishing the surface of the medium.

In conventional granular magnetic media (e.g., non-bit-patterned media), carbon overcoat layers are often used to protect the magnetic medium. Hard overcoat layers containing carbon beneficially improve corrosion resistance, enhance the tribological properties of the medium, and bond well with the polymer lubricants used in magnetic hard drive applications. However, when a conventional hard carbon overcoat layer is used as the inert filler material in a bit-patterned media application, conventional planarization techniques, such as chemical-mechanical polishing, are not able to efficiently polish the conventional hard carbon containing filler layer, if at all. In other words, conventional carbon containing protective layers, such as NCT, FTS, CPDS, DLC or FCAC carbon, are well suited to be implemented as protective overcoat layers but are not well suited to be used as filler material in planarization processes. Conventional fabrication techniques for bit-patterned magnetic media often include a series of planarization steps that involve applying and polishing non-carbon containing, non-magnetic, inert filler layers before applying a carbon containing overcoat layer. Such a process generally involves several steps that are performed to some degree under a vacuum (application of filler material, application of carbon containing overcoat), which increases the cost and complexity of the fabrication.

Therefore, the present disclosure provides for a 'soft' carbon containing planarization filler composition that is capable of being removed by chemical-mechanical polishing techniques. More specifically, the present disclosure includes details and descriptions relating to the use of two separate carbon containing layers, one to function as a stop layer for the chemical-mechanical polishing procedure and the other to function as a filler material. Thus, potentially only a single polishing step may be required to planarize and protect the medium with a protective carbon containing overcoat. In other words, multiple post-planarization steps (e.g. post planarization vacuum deposition of a carbon containing overcoat layer, post planarization film thickness probing) may not be required, thus saving time, energy, and money and reducing the complexity of fabrication.

Figure 3A:
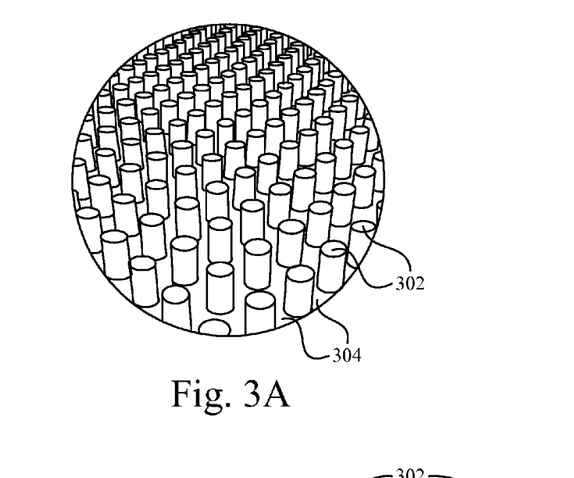
FIG. 3A is a perspective magnified view of the surface of a bit-patterned magnetic medium before planarization, according to one embodiment.

FIG. 3A is a perspective magnified view of the surface of a bit-patterned magnetic medium before planarization, according to one embodiment. The magnetic medium comprises island regions 302 and trench regions 304. The islands can range in width, height, size, and density, according to the specifics of a given application. For example, the islands may be substantially cylindrical, as depicted, or the bits may be substantially rectangular, conical, elliptical, or pyramid-like. In a preferred embodiment, the islands are somewhat rectangular in that they have a down-track length that is less than a cross-track width. Additionally, the sidewalls of the islands may be sloped at a different angle than as depicted in FIG. 3A (as well as, e.g., FIG. 3B) or the sidewalls of the islands may be recessed due to isotropic etching. The distance between the bits, known as the bit pitch, can be as small as several nanometers in some implementations.

Figure 3B:
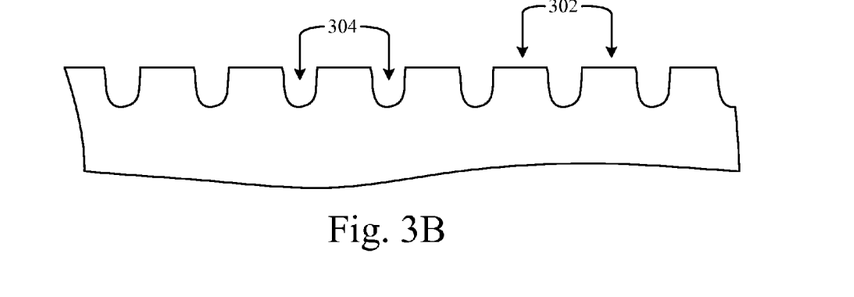
FIG. 3B is a cross-sectional side view of a bit-patterned magnetic medium, according to one embodiment.

FIG. 3B is a cross-sectional side view of the bit-patterned magnetic medium of FIG. 3A, according to one embodiment. Once again, the island regions 302 and the trench regions 304 are depicted. The islands and the trenches may have been etched into a substrate and then subsequently coated with a magnetic material. In another embodiment, the substrate may be substantially flat and a magnetic material may be applied over the substrate. The islands and trenches may then be etched directly into the magnetic material. A substrate is not depicted in FIG. 3B to avoid obscuring the present disclosure. Additionally, although not depicted, the medium may include various areas with different bit patterns and physical specifications. For example, a magnetic medium may have data regions and servo regions. The data regions may have island regions 302 and trench regions 304 with certain height/depth/shape characteristics while the servo regions may have other height/depth/shape characteristics. In other words, the depicted drawings are not intended to limit the scope of the present disclosure to certain bit-patterned magnetic media with the depicted shape or size.

Figure 3C:
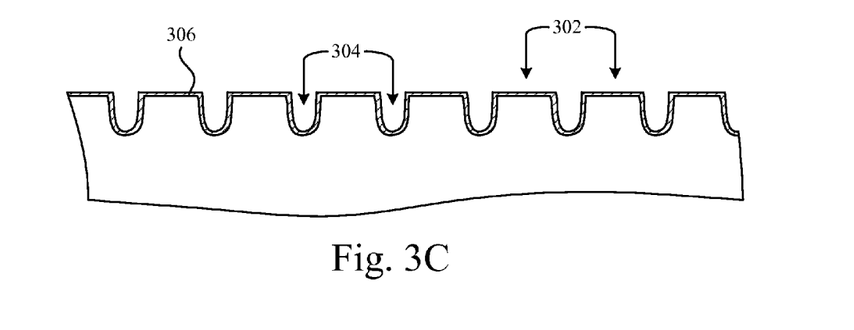
FIG. 3C is a cross-sectional side view of the bit-patterned magnetic medium of FIG. 3B but with a first carbon layer applied over the magnetic medium, according to one embodiment.

FIG. 3C is a cross-sectional side view of the bit-patterned magnetic medium of FIG. 3B but with a first carbon layer 306 applied over the magnetic medium, according to one embodiment. The first carbon layer 306 may be a conventional protective overcoat-type material. For example, hard carbon films may be sputtered or otherwise deposited/applied onto the magnetic medium, both in the island regions 302 and the trench regions 304. Harder carbon can be applied by plasma enhanced chemical vapor deposition (PECVD) processes in which a precursor gas is inserted into a plasma and the gas is broken down and the carbon is deposited on the substrate in an energized state and can incorporate hydrogen in it. Acetylene, which contains carbon and hydrogen, is an example of a precursor gas. NCT carbon, manufactured by Intevac Inc. in California, is a type of 'hard' PECVD carbon. Sputtering from a carbon target while applying a bias voltage to the substrate can also produce harder carbon. Additionally, there are different variations for sputtering thin films, such as conventional sputtering and facing target sputtering. Facing target sputtering can be used to make hard carbon. An alternative means of depositing hard carbon is by sputtering from a carbon target, adding hydrogen to the sputter gas and applying a voltage bias to the substrate.

The first carbon layer 306 may be applied on the magnetic medium to a thickness of between about 0.5 nanometers and 3.0 nanometers. In another embodiment, the thickness may be between about 1.0 nanometer and 2.0 nanometers. In yet another embodiment, the thickness of the hard carbon film may be about 1.4 nanometers. The first carbon layer 306 may actually be built up from multiple layers of carbon. According to one embodiment, the first carbon layer 306 has a comparatively higher density than the second carbon layer 308 (see the description below with reference to FIG. 3D for additional details on the second carbon layer 308). For example, the first carbon layer 306 may have a density in the range of between about 1.5 grams/cc and 3.0 grams/cc. In another embodiment, the first carbon layer 306 has a density of about 2.0 grams/cc. In another embodiment, the first carbon layer has a density of about 2.3 grams/cc. In another embodiment, the first carbon layer has a density of about 2.6 grams/cc. The 'hard' carbon containing protective layer, according to one embodiment, may have a hardness rating above about 10 giga-pascals (GPa). According to another embodiment, the hardness rating of such material is between about 10 GPa and 30 GPa. According to yet another embodiment, the hardness rating of the 'hard' carbon containing protective layer is about 20 GPa.

Figure 3D:
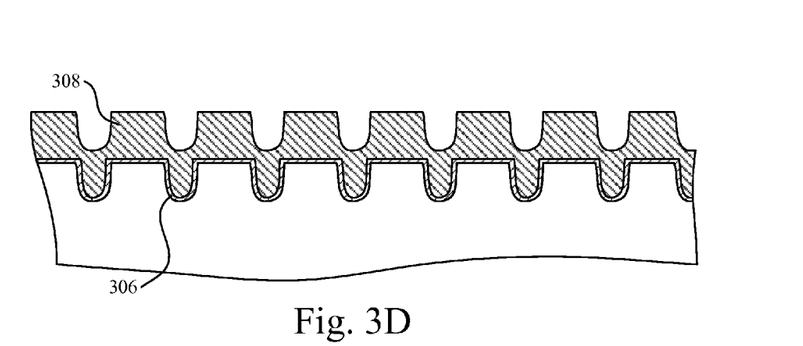
FIG. 3D is a cross-sectional side view of the bit-patterned magnetic medium of FIG. 3C but with a second carbon layer applied over the first carbon layer, according to one embodiment.

FIG. 3D is a cross-sectional side view of the bit-patterned magnetic medium of FIG. 3C but with a second carbon layer 308 applied over the first carbon layer 306, according to one embodiment. In one embodiment, the second carbon layer 308 may be a nitrogenated or hydrogenated carbon containing material. The second carbon layer 308 may be substantially softer than the first carbon layer 306 or at least may be more susceptible to chemical-mechanical polishing. The second carbon layer 308 may be sputtered or otherwise deposited/applied onto the first carbon layer 306, both in the island regions 302 and the trench regions 304. In an alternative embodiment, the fill carbon layer would not extend above the height of the island land. In this alternative embodiment, most or all of the fill carbon on the land would be polished off and the fill carbon in the groove would be polished much less as it is somewhat protected from polishing by the island walls that define the groove width. This alternative embodiment would need less time to polish since the thickness of the fill layer on the land is less. Hence it might have advantages in terms of lower manufacturing cost.

The hardness of the carbon can be adjusted by adding dopants during the deposition/application process. For example, the addition of hydrogen and nitrogen may make the carbon softer. In some implementations, the 'soft' carbon film may comprise hydrogenated carbon (CHx), nitrogenated carbon (CNx), or a combination of hydrogenated and nitrogenated carbon. The thickness of the second carbon layer 308 may vary according to the specifics of a given implementation. For example, and according to one embodiment, the second carbon layer 308 may be applied to a certain thickness so that the second carbon layer 308 in the trench regions 304 extends several nanometers above the height of the islands regions 302. For example, and according to one embodiment, the thickness of the second carbon layer 308 (after deposition but before polishing) can have a range from less than the groove depth to 5 times the groove depth. In one embodiment, the deposited second carbon layer 308 is between about 2 nm and 30 nm thick. In another embodiment, the deposited second carbon layer 308 is between about 2 nm and 15 nm thick. In yet another embodiment, the thickness of the deposited second carbon layer 308 is between 2 nm and 10 nm.

The density of the second carbon layer 308 may be between about 1.0 gram/cc and 2.0 grams/cc. In another embodiment, the density of the second carbon layer 308 is about 1.5 grams/cc. The 'soft' carbon containing filler layer, according to one embodiment, may have a hardness rating below about 20 GPa. According to another embodiment, the hardness rating of such material is between about 2 GPa and 20 GPa. According to yet another embodiment, the hardness rating of the 'soft' carbon containing filler layer is about 10 GPa.

The hardness of the carbon layer may be affected by the amount of sp3-type bonding that is present in a particular film. For example, as briefly described above, the addition of dopants (e.g., hydrogen and nitrogen) may affect the relative amount of sp3-type bonding that is present in carbon film. According to one embodiment, sp3-type bonds are stronger and create a denser and harder carbon. For example, diamond is an extremely hard carbon due to the high amount of sp3-type bonding in its morphology. Accordingly, harder carbon layers are sometimes referred to as diamond-like (i.e., diamond like carbon, "DLC").

Figure 3E:
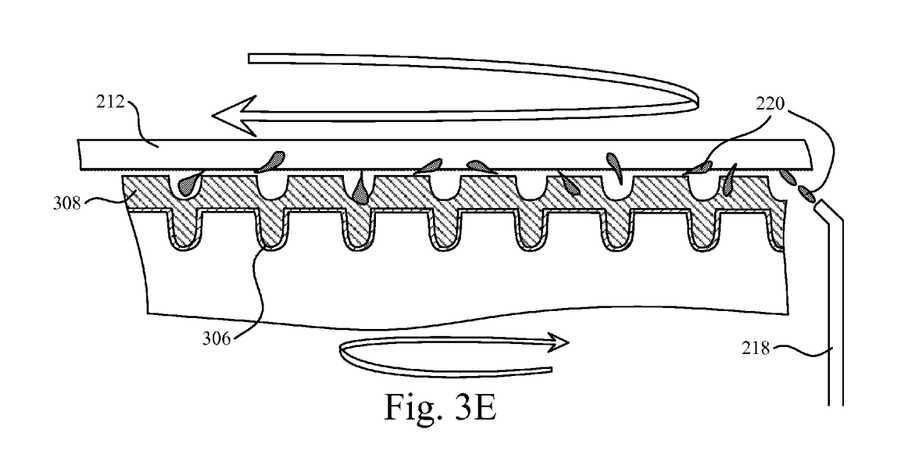
FIG. 3E is a cross-sectional side view of the bit-patterned magnetic medium of FIG. 3D during a chemical-mechanical polishing procedure, according to one embodiment.

FIG. 3E is a cross-sectional side view of the bit-patterned magnetic medium of FIG. 3D during a chemical-mechanical polishing procedure, according to one embodiment. Although most chemical-mechanical polishing procedures would be inverted (the medium would be on top with the surface to be polished facing downwards and towards the abrasive surface of the polishing pad 212), the elements of FIG. 3E are oriented in the depicted manner for visual consistency and clarity. The slurry supply line 218 injects/drips slurry 220 onto the polishing pad 212. While the slurry in FIG. 3E is depicted as large droplets, in practice the slurry would most likely not form into large droplets and would most likely not spin out and away from the pad 212 in the depicted manner. FIG. 3E depicts the process of removing the second carbon layer 308 until the pad 212 reaches the first carbon layer 306.

Figure 3F:
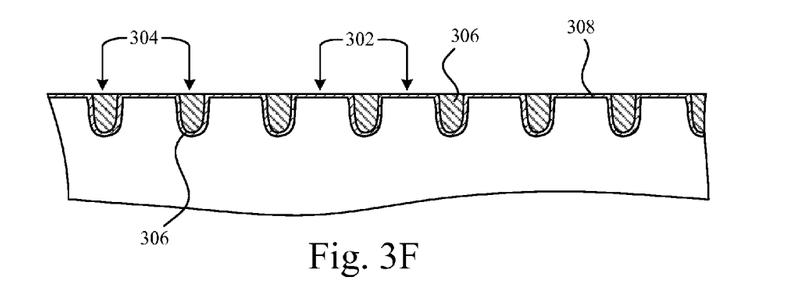
FIG. 3F is a cross-sectional side view of the bit-patterned magnetic medium of FIG. 3E after a chemical-mechanical polishing procedure, wherein the second carbon layer has been removed in the island regions, according to one embodiment.

FIG. 3F is a cross-sectional side view of the bit-patterned magnetic medium of FIG. 3E after a chemical-mechanical polishing procedure, wherein the second carbon layer 308 has been removed in the island regions 302, according to one embodiment. As described above, since the first carbon layer 306 is less affected by chemical-mechanical polishing, once the polishing pad 212 reaches the first carbon layer 306 coating the island regions 302, the material removal rate drops to a lower value and the polishing procedure may be finished or may continue for a short time to ensure that all of the disk has been properly and sufficiently polished. The composition and relative hardness of the first and second carbon layers 306, 308 is selected so that the polish rate of the first layer 306 is at least two times lower than the polish rate of the second layer 308. In an alternative embodiment, the polish rate of the second layer 308 is more than three times faster than the polish rate of the first carbon layer 306. The medium, as depicted, includes the exposed first carbon layer 306 in the island regions 302 and the second carbon layer 308 in the trench regions. With carbon containing layers 306, 308 coating the surface of the medium, additional protective overcoats may not be needed as the applied carbon layers increase erosion resistance, enhance the tribological properties of the medium, and bond well with polymer lubricants often used in magnetic hard drive applications. Additionally, the hardness may vary across the width and depth of the carbon layers 306, 308.

Figure 4A:
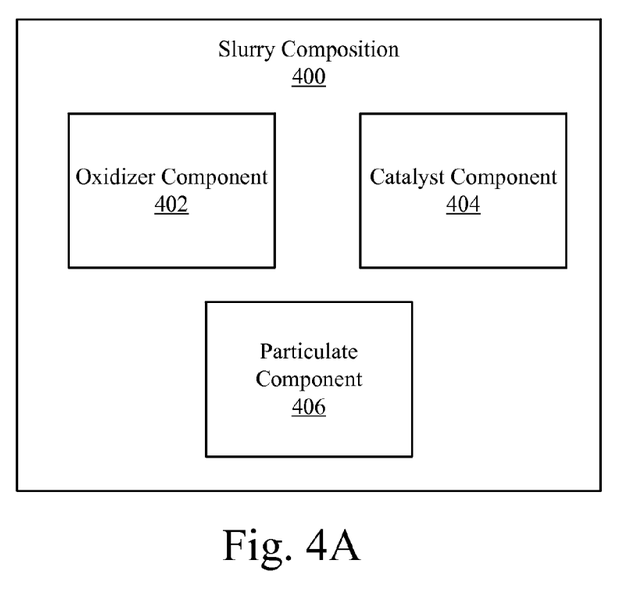
FIG. 4A is a schematic block diagram of one embodiment of a slurry composition for chemically-mechanically polishing a bit-patterned magnetic medium.

FIG. 4A is a schematic block diagram of one embodiment 400 of a slurry composition for chemically-mechanically polishing a bit-patterned magnetic medium. As described briefly above, chemical-mechanical planarization involves chemical reagents and mechanical forces to polish and remove material from the surface of a medium. Often, chemicals and particulate matter are suspended in slurry and are dispersed across the polishing pad and the medium during planarization. Various types of slurries are capable of being used in chemical-mechanical polishing applications, such diamond particle slurries and colloidal silica and colloidal alumina slurries.

The slurry composition of the present disclosure, according to one embodiment 400, includes an oxidizer component 402, a catalyst component 404, and a particulate component 406. The oxidizer component 402 is capable of polishing carbon containing films. According to one embodiment, hydrogen peroxide may be used as the oxidizer component 402 for polishing carbon films by forming highly reactive oxygen radicals. Other oxidizers that may be used as the oxidizer component include potassium permanganate and nitric acid, among others. It is contemplated that one of ordinary skill in the art will recognize other suitable oxidizing components 402 that may be used in the slurry composition.

The catalyst component 404 enhances the reactivity of the slurry composition. According to one embodiment, ferrous sulfate may be used as the catalyst component 404 because iron catalyzes the formation of the oxygen radicals when hydrogen peroxide is used as the oxidizer component 402. Other transition metal salts, such as copper, manganese, and cobalt salts may be used as the catalyst component 404. The presence of a particulate component 406 enhances the effectiveness of the polishing procedure and increases the material removal rate. Colloidal silica particles or diamond particles may be used as the particulate component 406 of the slurry composition, among others. Once again, it is contemplated that one of skill in the art will recognize other suitable materials that may be used as the catalyst component 404 and/or the particulate component 406, depending on the specifics of a given implementation.

Figure 4B:
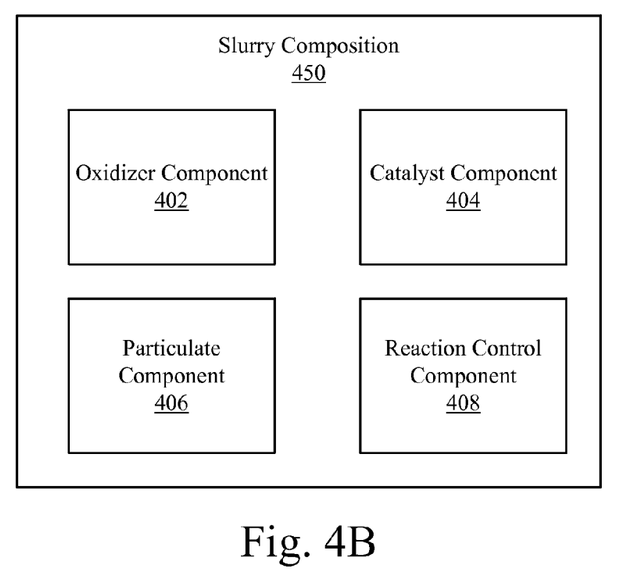
FIG. 4B is a schematic block diagram of another embodiment of a slurry composition for chemically-mechanically polishing a bit-patterned magnetic medium.

FIG. 4B is a schematic block diagram of another embodiment 450 of a slurry composition for chemically-mechanically polishing a bit-patterned magnetic medium. The slurry composition, according to one embodiment 450, includes an oxidizer component 402, a catalyst component 404, a particulate component 406, and a reaction control component 408. The oxidizer component 402, catalyst component 404, and particulate component 406 are described above with reference to FIG. 4A. The reaction control component 408 controls the slurry reactivity by controlling the pH of the slurry. Under acidic conditions, the reactivity of the slurry decreases, thus limiting or stopping the polishing procedure. Under basic conditions, the reactivity of the slurry composition increases and the polishing procedure and material removal rate are enhanced. Accordingly, the reaction control component 408 may comprise an acid or a base, depending on the desired effect. In one embodiment, the reaction control component 408 may be stored separately from the remaining components of the slurry composition and only combined with the other components upon the polishing pad 212 during (or preceding) a polishing procedure. Examples of suitable acids include, but are not limited to, citric acid, lactic acid, acetic acid, formic acid, oxalic acid, and uric acid, among others. Examples of suitable bases include, but are not limited to, potassium hydroxide and sodium hydroxide, among others. It is contemplated that one of skill in the art will be able to recognize other acids and bases that may function to decrease or enhance the polishing rate, respectively.

Figure 5:
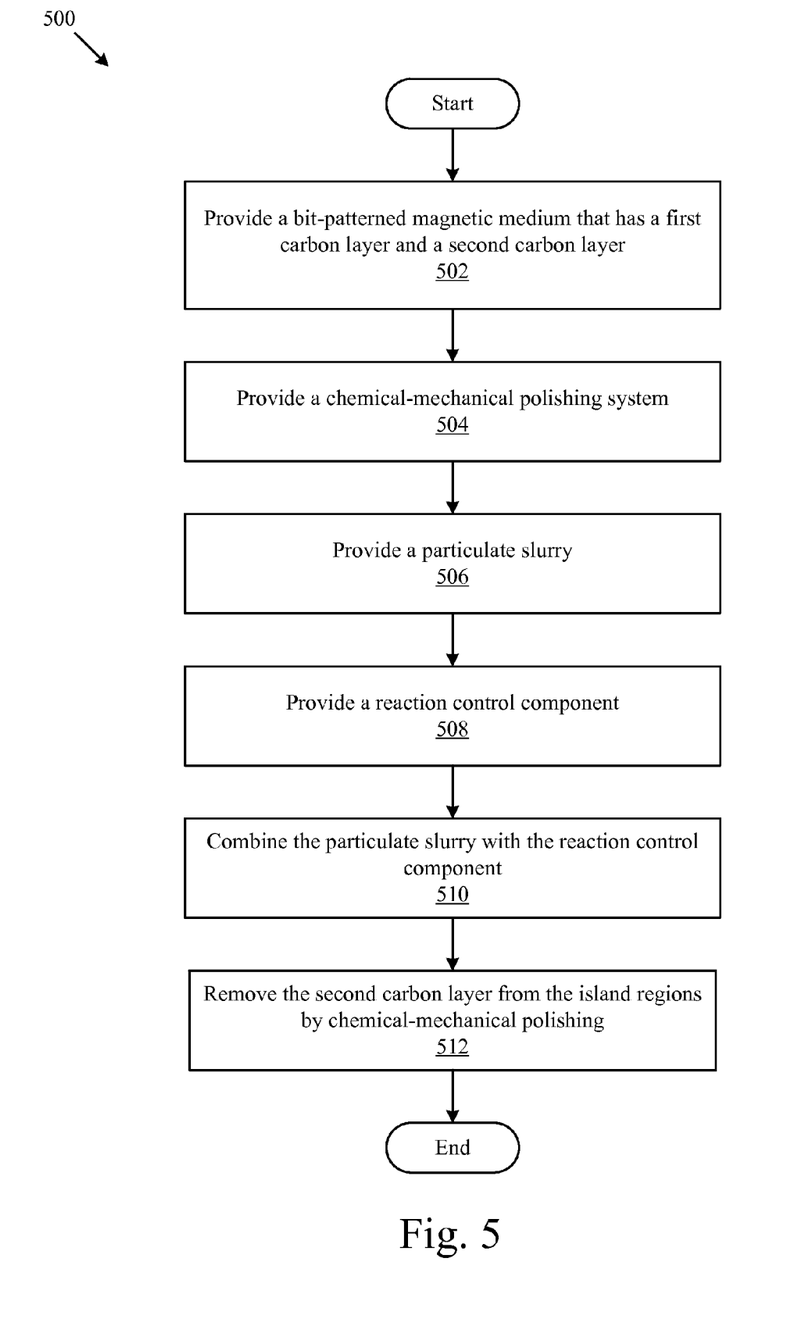
FIG. 5 is a schematic flow chart diagram of one embodiment of a method for planarizing a bit-patterned magnetic medium.

FIG. 5 is a schematic flow chart diagram of one embodiment of a method 500 for planarizing a bit-patterned magnetic medium. The method 500 includes providing 502 a bit-patterned magnetic medium that comprises a magnetic layer with trench regions 304 and island regions 302, a first carbon layer 306 applied over the magnetic layer, and a second carbon layer 308 applied over the first carbon layer 306. The method 500 also includes providing 504 a chemical-mechanical polishing system that comprises a polishing pad, providing 506 a particulate slurry, and providing 508 a reaction control component. The method 500 provides for combining 510 the particulate slurry and the reaction control component to form a polishing slurry and finally for removing 512 the second carbon layer from the island regions by polishing the bit-patterned magnetic medium with the polishing pad wetted with the polishing slurry. As described above, the particulate slurry 402, 404, 406 and the reaction control component 408 may be stored separately but combined 510 together on the polishing pad 212 during or before the chemical-mechanical polishing step 512.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Also, securing one element to another element can include direct and indirect securing. Additionally, as used herein, "adjacent" does not necessarily denote contact (i.e., one element can be adjacent to another without being in contact with the other).

The subject matter of the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A planarized bit-patterned magnetic medium comprising:
    a magnetic layer comprising island regions and trench regions;
    a first carbon layer applied over the magnetic layer; and
    a second carbon layer applied over the first carbon layer, the second carbon layer comprising hydrogenated and nitrogenated carbon compounds, wherein a composition of the second carbon layer varies across a thickness of the second carbon layer;
    wherein the second carbon layer has been substantially removed from above the island regions.

2. The planarized bit-patterned magnetic medium of claim 1, wherein the first carbon layer has a lower material removal rate when exposed to chemical-mechanical polishing than the second carbon layer.

3. The planarized bit-patterned magnetic medium of claim 1, wherein the first carbon layer has a higher density than the second carbon layer.

4. The planarized bit-patterned magnetic medium of claim 1, wherein the first carbon layer has a higher sp3-type bond content than the second carbon layer.

5. The planarized bit-patterned magnetic medium of claim 1, wherein the first carbon layer has a higher hardness rating than the second carbon layer.

6. The planarized bit-patterned magnetic medium of claim 1, wherein the first carbon layer has a hardness rating about or above 15 GPa and the second carbon layer has a hardness rating that is less than 15 GPa.

7. The planarized bit-patterned magnetic medium of claim 1, wherein the first carbon layer has a density greater than 2.0 gm/cc and the second carbon layer has a density less than 2.0 gm/cc.

8. The planarized bit-patterned magnetic medium of claim 1, wherein the first carbon layer has a density greater than 2.2 gm/cc and the second carbon layer has a density less than 2.2 gm/cc.

9. The planarized bit-patterned magnetic medium of claim 1, wherein the first carbon layer has a density greater than 2.0 gm/cc and the second carbon layer has a density less than 1.8 gm/cc.

10. A method for planarizing a bit-patterned magnetic medium, the method comprising:
    providing a bit-patterned magnetic medium that comprises a magnetic layer with trench regions and island regions, a first carbon layer applied over the magnetic layer, and a second carbon layer applied over the first carbon layer;
    providing a chemical-mechanical polishing system that comprises a polishing pad; providing a particulate slurry;
    providing a reaction control component;
    combining the particulate slurry and the reaction control component to form a polishing slurry; and
    removing the second carbon layer from the island regions by polishing the bit-patterned magnetic medium with the polishing pad wetted with the polishing slurry;
    wherein the second carbon layer comprises hydrogenated and nitrogenated carbon compounds, and a composition of the second carbon layer varies across a thickness of the second carbon layer.

11. The method of claim 10, wherein providing the particulate slurry comprises providing an oxidizer component, a catalyst component, and a particulate component.

12. The method of claim 10, wherein the reaction control component comprises a base to promote the reaction.

13. The method of claim 12, wherein the reaction control component comprises a hydroxide salt.

14. The method of claim 10, wherein combining the particulate slurry and the reaction control component comprises injecting both onto the polishing pad during or before chemical-mechanical polishing.

* * * * *